Patented Dec. 25, 1934

1,985,235

UNITED STATES PATENT OFFICE 1,985,235

PREPARATION OF BRAZIL NUTS FOR SHELLING

James Eustace Bizzell, Newark, and Carey K. Bizzell, Elizabeth, N. J.

No Drawing. Application September 29, 1932
Serial No. 635,462

1 Claim. (Cl. 146—219)

The object of our invention is to prepare Brazil nuts for shelling so the kernels will come out whole and with their natural flavor and moisture.

The art at present reveals the use of water or steam in preparing Brazil nuts for shelling. Under the process of using water to soften the shells the kernel becomes watermarked and stained from the dye in the pericarp, thus giving a poor commercial product. The steam processes with which we are familiar use different temperatures, pressure ranges, and periods of exposure. Those steam processes revealed, none of which are in commercial use so far as we can ascertain, give a cooked taste to the kernel, thus making it an undesirable product.

In order to accomplish our object we have obtained satisfactory results by enclosing Brazil nuts in a metal container of any shape or design and subjecting the nuts to a steam flash of sixty pounds pressure for from twenty to forty seconds. This short flash of steam (which is estimated at about 300° F.), it appears, is sufficient to change the texture of the shell, as far as the kernel, so that it cracks easily and permits the kernel to drop away. The kernel when removed under this process does not appear to be affected either in texture, taste or moisture content.

We claim:

The treatment of Brazil nuts, in their natural state in the shell, by steam flash of approximately sixty pounds pressure for not exceeding forty seconds and immediately thereafter cracking the shells and removing the kernels.

J. EUSTACE BIZZELL.
CAREY K. BIZZELL.